(12) United States Patent
Tsai (10) Patent No.: US 7,213,937 B2
(45) Date of Patent: May 8, 2007

(54) BACKLIGHT MODULE

(75) Inventor: Yi-Shiuan Tsai, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 86 days.

(21) Appl. No.: 10/910,425

(22) Filed: Aug. 3, 2004

(65) Prior Publication Data
US 2005/0225960 A1   Oct. 13, 2005

(30) Foreign Application Priority Data
Apr. 1, 2004   (TW) ............................... 93109039 A (51) Int. Cl.
*F21S 4/00* (2006.01)
(52) U.S. Cl. .................. 362/224; 362/84; 362/223; 362/240; 362/246; 362/247; 349/58
(58) Field of Classification Search .................. 362/29, 362/84, 97, 223, 224, 240, 246, 247, 611, 362/632–634, 87, 307; 349/58, 69
See application file for complete search history.

(56) References Cited

U.S. PATENT DOCUMENTS 6,783,256 B2 * 8/2004 Moon .......................... 362/241
6,824,287 B2 * 11/2004 Moon .......................... 362/84
6,974,221 B2 * 12/2005 Wu et al. ...................... 362/29
2004/0012763 A1 * 1/2004 Yu et al. ...................... 353/122
2004/0239829 A1 * 12/2004 Yu et al. ....................... 349/61
2005/0088809 A1 * 4/2005 Nakagawa et al. ......... 361/681

FOREIGN PATENT DOCUMENTS

JP         10-326517      8/1998
JP         2001-210126    3/2001

* cited by examiner

Primary Examiner—Stephen F Husar
Assistant Examiner—Meghan K. Dunwiddie
(74) Attorney, Agent, or Firm—Thomas, Kayden, Horstemeyer & Risley (57) ABSTRACT

A backlight module. The backlight module comprises a housing, a light source disposed on the housing, a diffuser positioned over the light source and a spacer disposed between the housing and the diffuser to maintain a distance therebetween. The spacer comprises a supporting portion to support the diffuser to maintain the separation and a base connected to the supporting portion and fixed on the housing. The base comprises a hook engaging the housing and a connecting portion connecting the supporting portion and the hook. A reflective layer is formed on the supporting portion to reflect the light from the light source.

17 Claims, 9 Drawing Sheets

BACKLIGHT MODULE

BACKGROUND OF THE INVENTION

1. Field of the Invention

The present invention relates to a backlight module, and in particular to a backlight module having a spacer maintaining a distance between a diffuser and a light source.

2. Description of the Related Art

Figure 1:
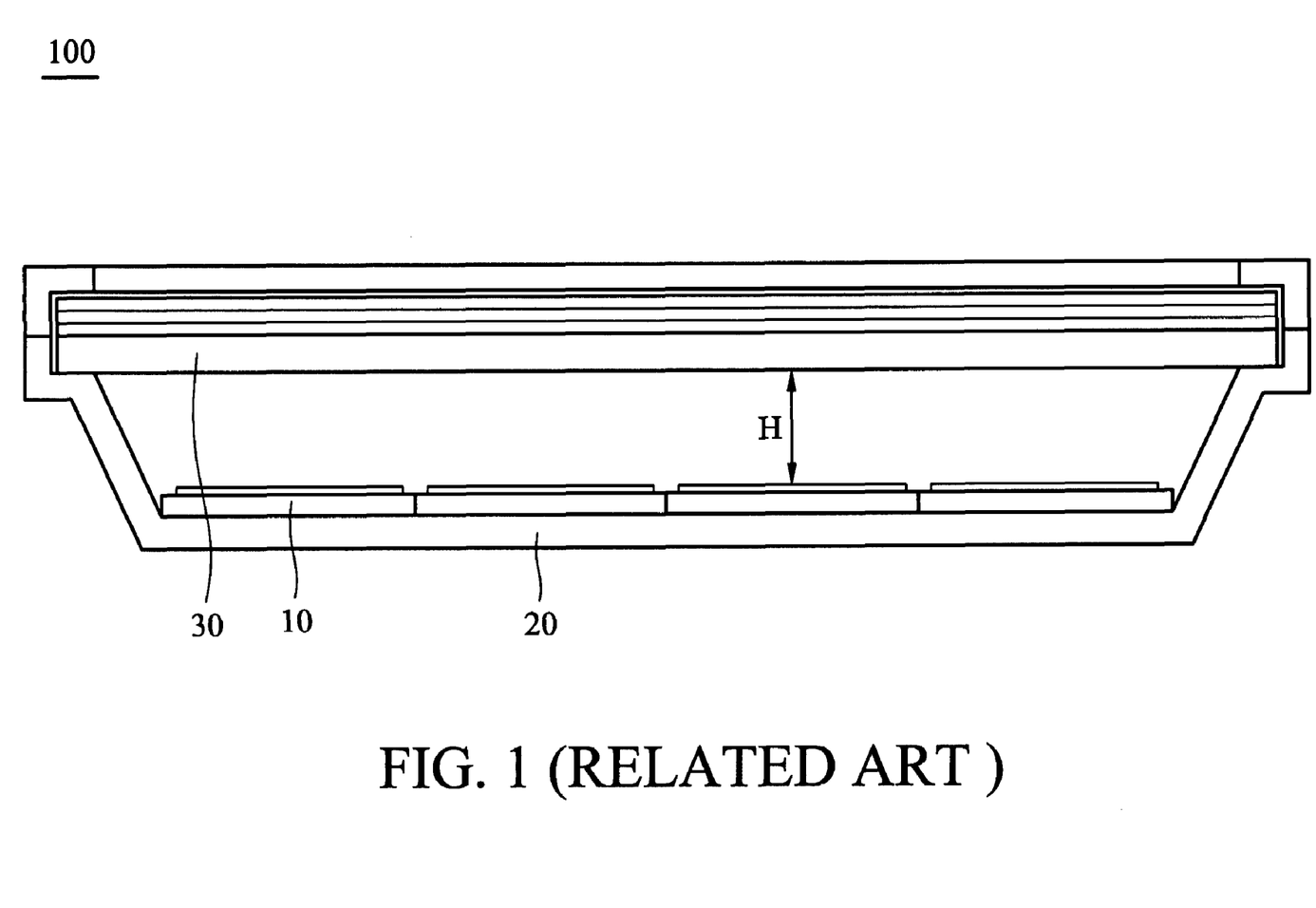
FIG. 1 is a cross section of a conventional backlight module as referenced in the Related Art.

As shown in FIG. 1, a conventional backlight module 100 has a light source (flat light) 10 disposed on a housing 20. The light from the light source 10 is diffused and normalized by a diffuser 30. In this condition, the diffuser 30 is separated from the light source 10 by a distance H to ensure diffusion.

However, the diffuser 30 is often deformed by its weight or the heat from the light source 10 such that distance H varies, resulting in non-uniform brightness. Therefore, a spacer is needed to maintain the distance between the diffuser 30 and the light source 10.

Japan patent 10-326517 discloses a conical spacer of transparent or white material to maintain a distance between a tubular light and a diffuser.

In addition, Japan patent 2001-210126 discloses a lamp holder for a backlight module. The lamp holder protects and separates lamps, and maintains the distance between the lamps and a diffuser.

SUMMARY OF THE INVENTION

Accordingly, an object of the invention is to provide an improved spacer to maintain a distance between a diffuser and a light source.

The present invention provides a backlight module, comprising a housing, a light source disposed on the housing, a diffuser positioned over the light source and a spacer disposed between the housing and the diffuser to maintain a distance therebetween.

The light source can be a flat light. The spacer comprises a supporting portion for the diffuser to maintain separation and a base connected to the supporting portion and fixed on the housing. The base comprises a hook engaging the housing and a connecting portion connecting the supporting portion and the hook. The housing least one first locating portion and the light source has at least one second locating portion corresponding to the first locating portion fixing the spacer on the housing. The first locating portion can be a first locating hole or a first locating groove receiving the connecting portion. Similarly, the second locating portion can be a second locating hole corresponding to the first locating hole or a second locating groove corresponding to the first locating groove receiving the connecting portion.

The supporting portion has a first supporting element contacting the diffuser and extending in a first direction parallel to the diffuser. The first supporting element further has at least one lateral surface inclined toward the diffuser with a predetermined angle and a reflecting layer formed on the lateral surface to reflect light from the light source. In certain conditions, the first supporting element may have two lateral surfaces conjugated at an angle of 20° to 60°.

The supporting portion may further have a second supporting element having the same structure as the first supporting element but extending in a second direction parallel to the diffuser and different from the first direction. This can enhance support to the diffuser.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In the embodiment, a backlight module with a flat light source is described in detail.

Figure 2:
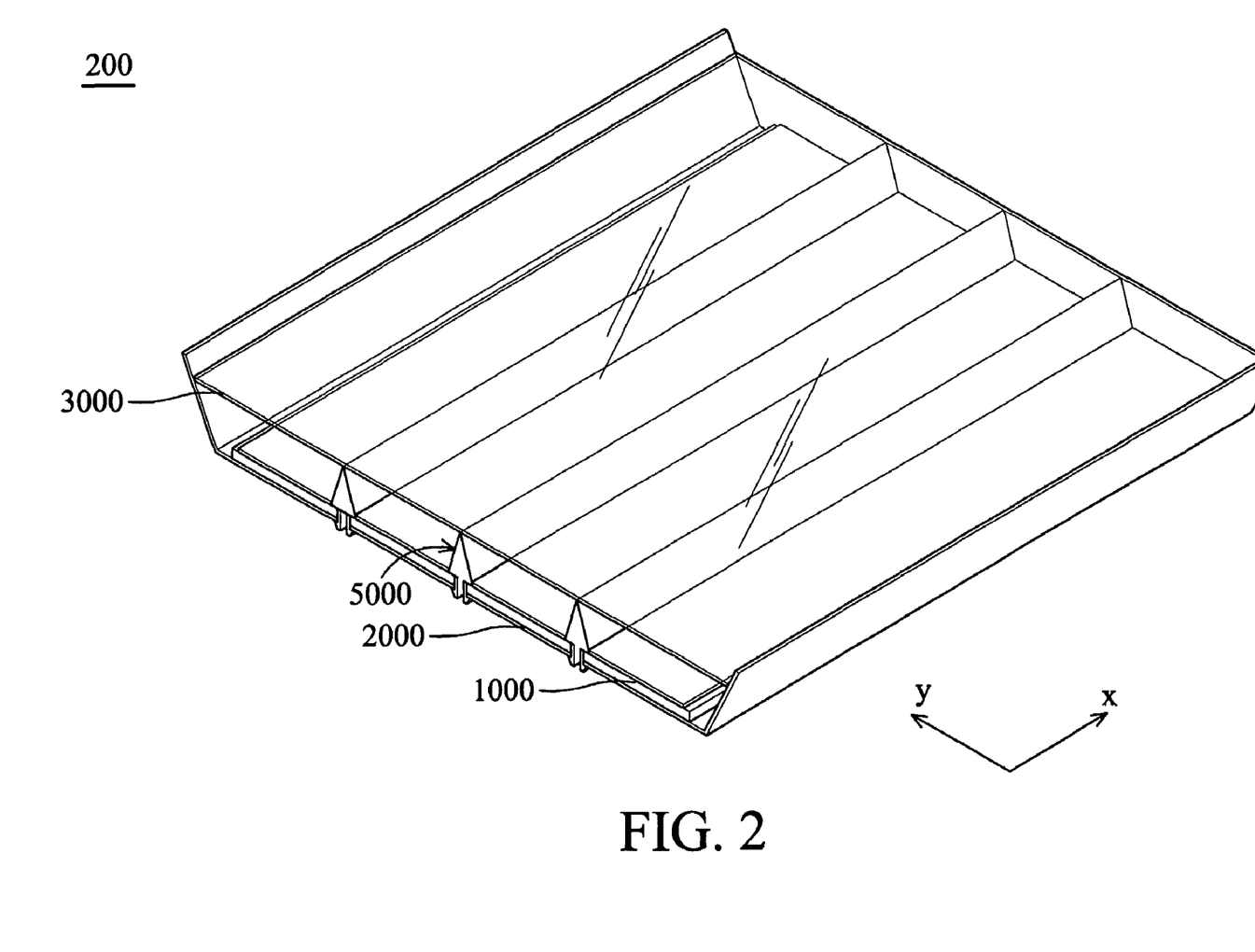
FIG. 2 is a perspective view of a backlight module in the invention.
Figure 3:
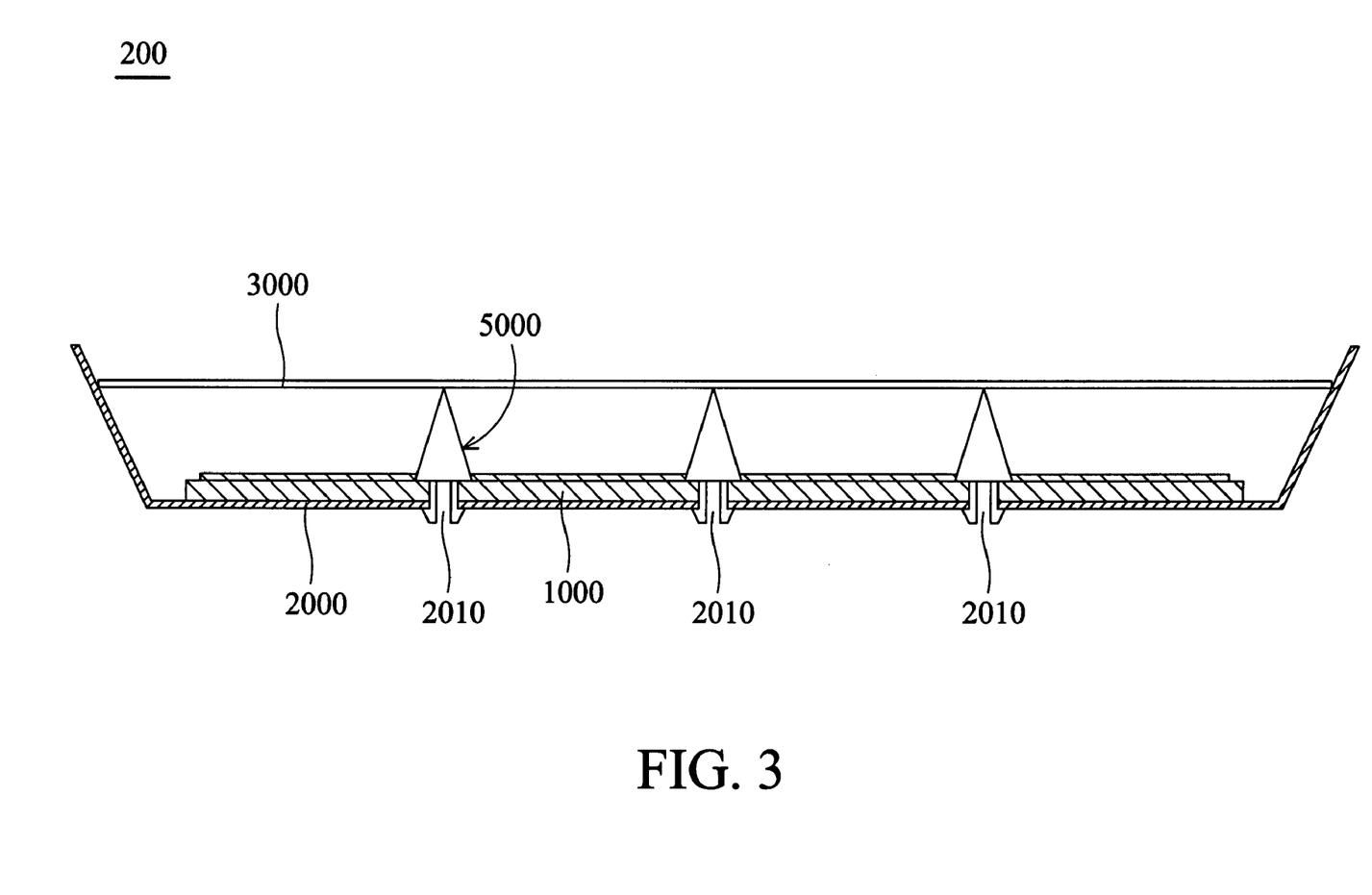
FIG. 3 is a cross section of the backlight module along line A—A in FIG. 2 of the invention.
Figure 4:
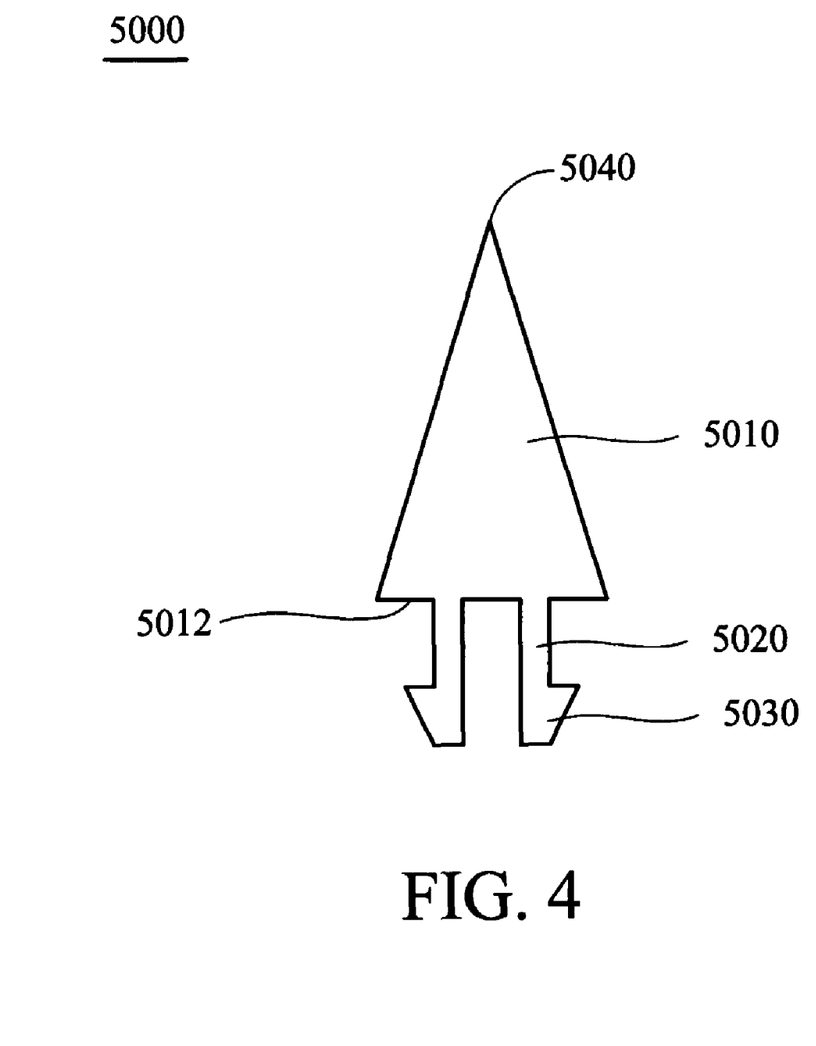
FIG. 4 is a front view of the spacer of the invention.

FIG. 2 is a perspective view of the backlight module of the invention. FIG. 3 is a cross section of the backlight module along the A—A line in FIG. 2. FIG. 4 is a front view of the spacer in the invention.

As shown in FIG. 2, a flat light source 1000 is disposed on a housing 2000. A spacer 5000 extends in x direction and is positioned between the flat light source 1000 and a diffuser 3000. The top (acting as a contacting portion 5040) of the spacer 5000 contacts the diffuser 3000, thereby maintaining a predetermined distance.

As shown in FIG. 3, three first locating grooves 2010 are defined on the housing 2000 and three second locating grooves 1010 aligned with the first locating groove 2010 are defined on the flat light source 1000. The spacer 5000 shown in FIG. 4 comprises a supporting portion 5010, a connecting portion 5020 and a latching element 5030. Returning to FIG. 3, the latching element 5030 has two hooks engaging an outer surface of the housing 2000; the connecting portion has two ribs connecting the supporting portion 5010 and the hooks extending through the first locating groove 2010 and the second locating groove 1010. The supporting portion 5010 is connected to the connecting portion 5020 to form a shoulder 5012 abutting the edge of the second locating groove 1010. Thereby, the spacer 5000 is fixed on the flat light source 1000. The height of the supporting portion 5010 is substantially equal to the predetermined distance between the flat light source 1000 and the diffuser 3000.

Another spacer (not shown) extending in y direction can also be disposed along with the spacer 5000 to form a spacer structure of crossed shape contributing to reinforcement of the diffuser 3000.

In addition, a reflective layer is formed on two lateral surfaces of the supporting portion 5010 to reflect the light from the flat light source. This avoids non-uniform brightness from the spacer 5000. The reflective layer is made of material with high reflectivity. The angle of the two lateral surfaces is 20° to 60°.

In addition, the first locating groove 2010 and the second locating groove 1010 can be replaced by a first locating hole and a second locating hole. The shape of the connecting portion 5020 and the latching element 5030 varies to match the first and second locating holes.

Figure 5:
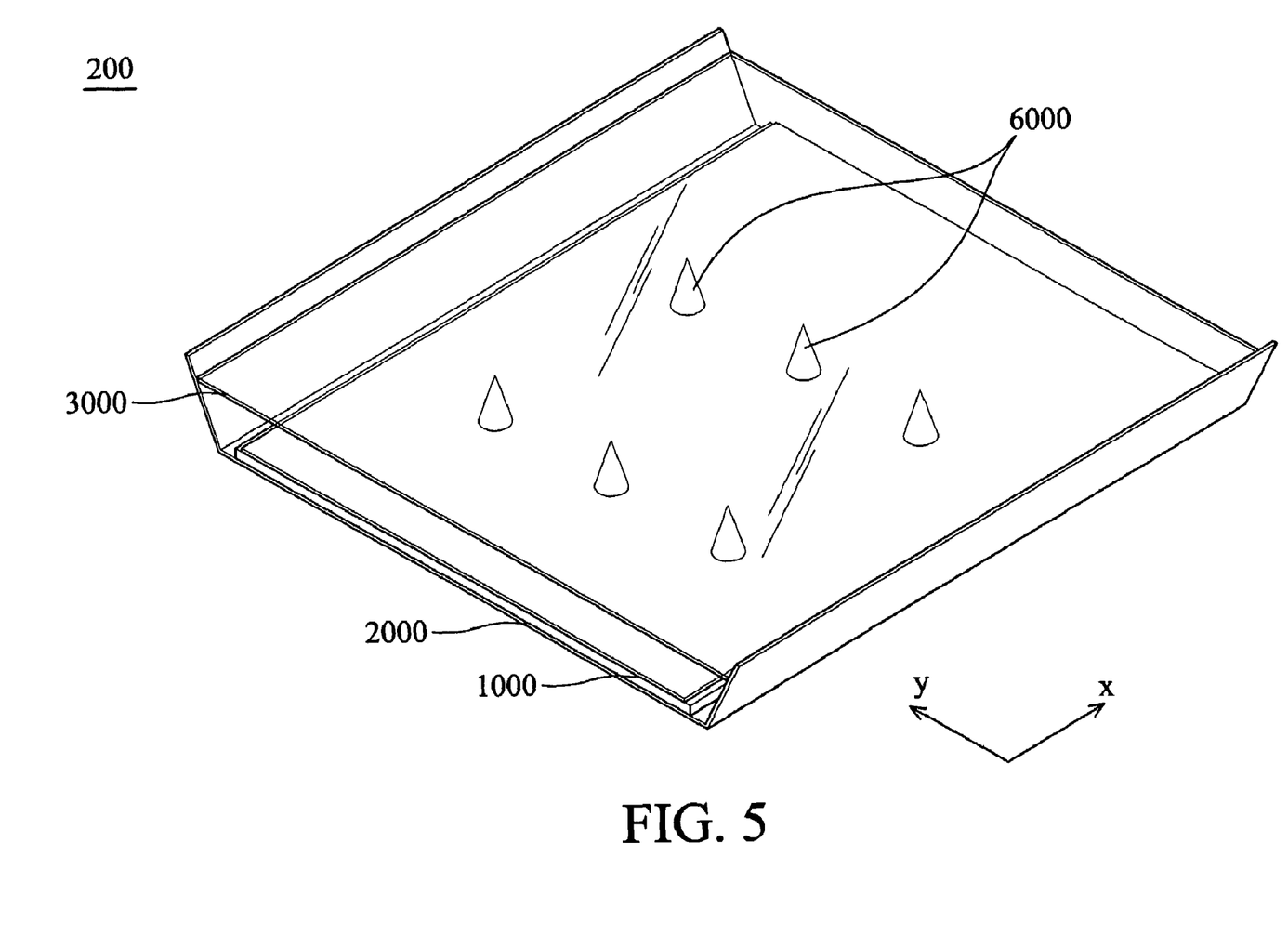
FIG. 5 is a perspective view of another embodiment of the invention.

As shown in FIG. 5, a plurality of conic spacers 6000 is disposed on the flat light source 1000. In such condition, the spacer 6000 may be made of transparent material or reflective material. The connecting portion and the latching portion (not shown) of spacer 6000 are configured in a column-shape.

Figure 6:
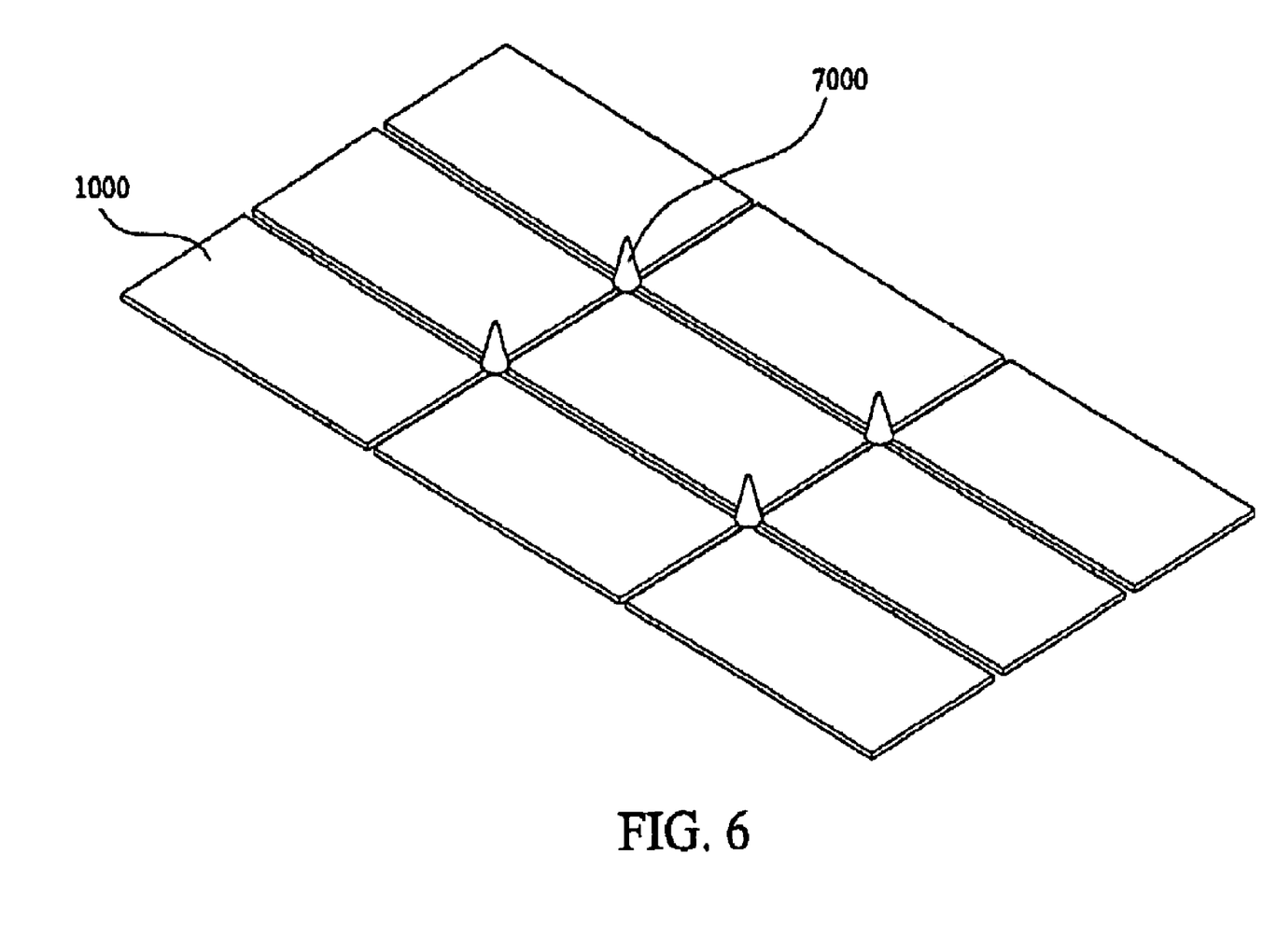
FIG. 6 is a perspective view of another embodiment of the invention.
Figure 7:
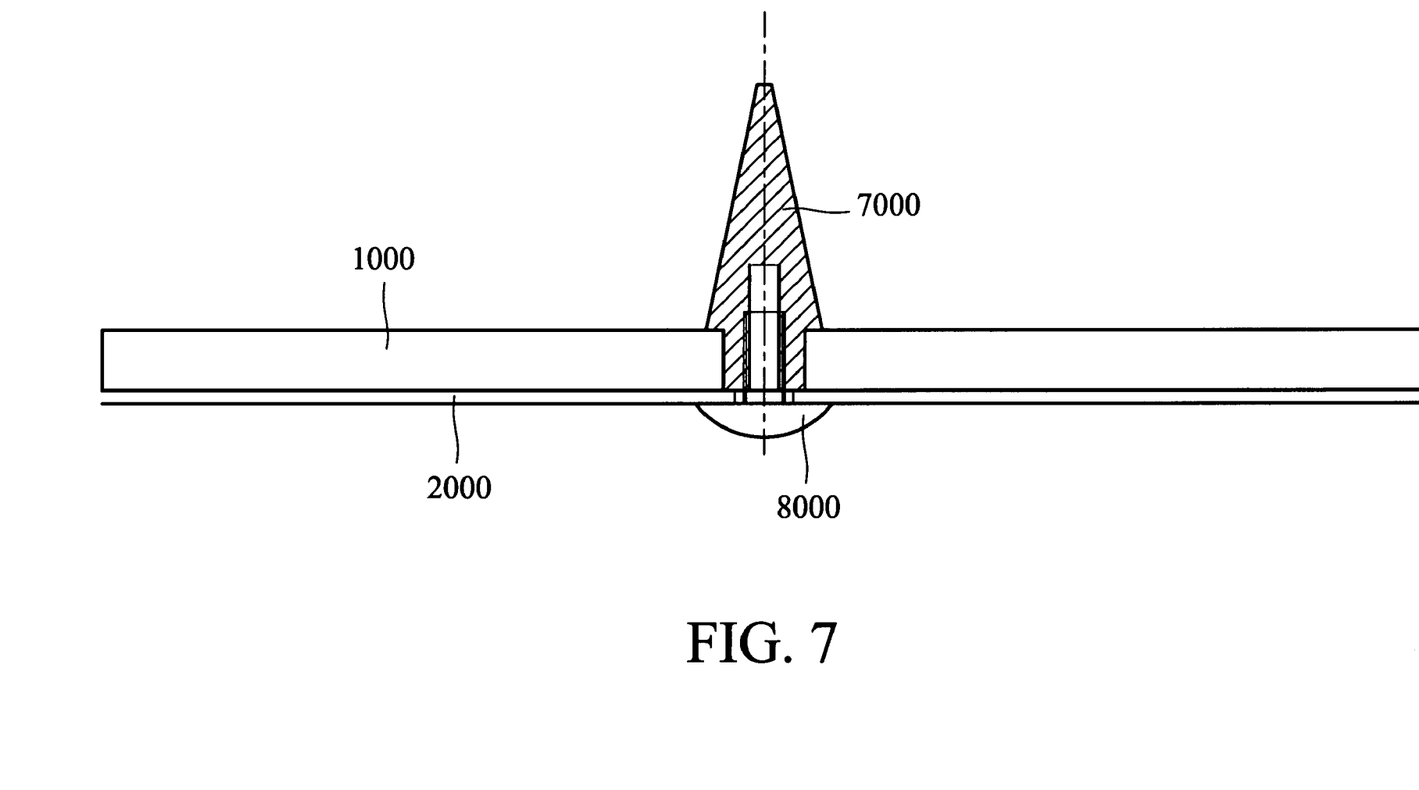
FIG. 7 is an enlarged cross section of the embodiment of the invention in FIG. 6.
Figure 8:
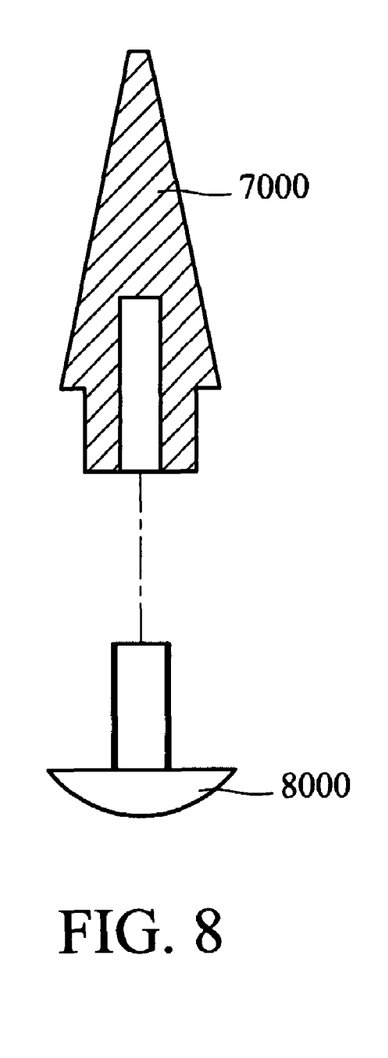
FIG. 8 is an exploded cross section of the spacer used in the embodiment of the invention in FIG. 7.
Figure 9A:
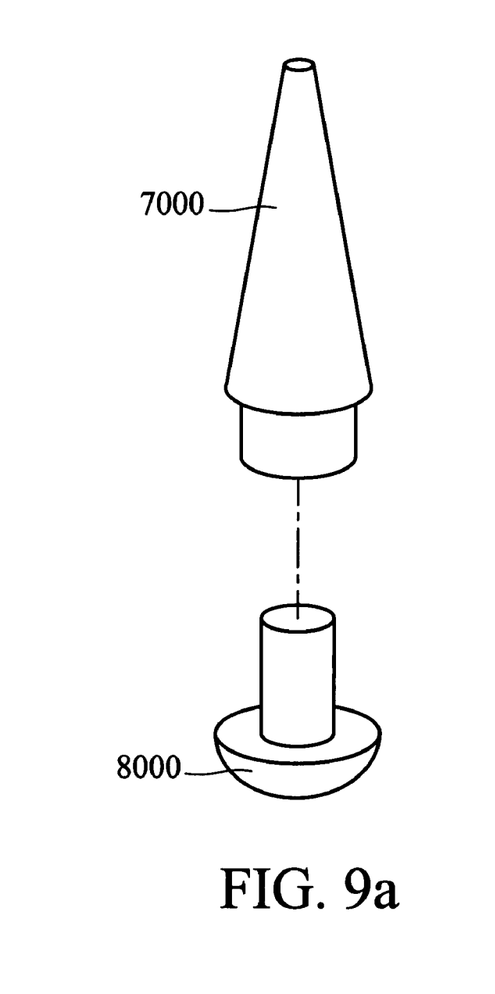
FIG. 9a is an exploded perspective view of the spacer in FIG. 7.
Figure 9B:
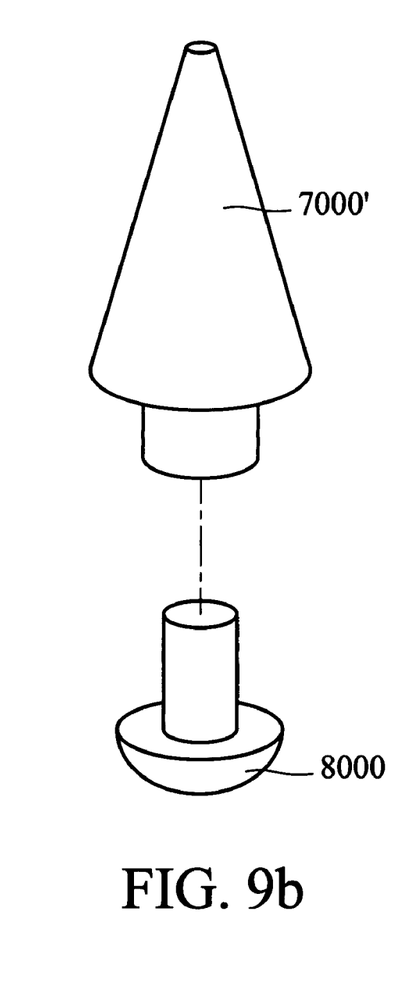
FIG. 9b is an exploded perspective view of another type of the spacer.

FIG. 6 shows another embodiment of the invention, a plurality of spacers 7000 is positioned between each flat light source 1000. FIG. 7 shows the cross section of the spacer 7000 and the flat light source 1000. The spacer 7000 is bolted between the flat light sources 1000 by a bolt 8000, and the exploded views of the spacer 7000 and the bolt 8000 are shown in FIGS. 8 and 9a. Another spacer 7000' with larger diameter can also be used (shown in FIG. 9b).

Although a flat light source is used in the embodiment, a tubular lamp is also adapted to the invention.

The spacer of the invention maintains the distance between the light source and the diffuser to prevent non-uniform brightness from deformation of the diffuser due to its own weight and heat from the light source. The longitudinal extending spacer of the invention provides superior support compared to conventional spacers described in the Related Art.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
   a housing having at least one first locating portion;
   a flat light source disposed on the housing;
   a diffuser positioned over the flat light source; and
   a spacer disposed between the housing and the diffuser to maintain a distance therebetween and comprising a supporting portion to support the diffuser and a base connected to the supporting portion, extending through the flat light source and fixed on the housing;
   wherein the supporting portion has a reflective layer thereon to reflect the light from the flat light source and a first supporting element contacting the diffuser and extending in a first direction parallel to the diffuser.

2. The backlight module as claimed in claim 1, wherein the base comprises a latching element engaging the housing and a connecting portion connecting the supporting portion and the latching element.

3. The backlight module as claimed in claim 1, wherein the first supporting element further has a contacting portion contacting the diffuser and at least one lateral surface inclined toward the diffuser at a predetermined angle; and the reflecting layer is formed on the lateral surface.

4. The backlight module as claimed in claim 3, wherein the first supporting element has two lateral surfaces conjugated at an angle of 20° to 60°.

5. The backlight module as claimed in claim 3, wherein the supporting portion further has a second supporting element having the same structure as the first supporting element but extending in a second direction parallel to the diffuser and different from the first direction.

6. The backlight module as claimed in claim 2, wherein the first locating portion comprises a locating hole receiving the connecting portion.

7. The backlight module as claimed in claim 2, wherein the first locating portion comprises a locating groove receiving the connecting portion.

8. The backlight module as claimed in claim 2, wherein the flat light source is a flat light.

9. The backlight module as claimed in claim 8, wherein the flat light source has at least one second locating portion corresponding to the first locating portion.

10. The backlight module as claimed in claim 9, wherein the supporting portion has a first supporting element contacting the diffuser and extending in a first direction parallel to the diffuser.

11. The backlight module as claimed in claim 10, wherein the first supporting element further has a contacting portion contacting the diffuser and at least one lateral surface inclined toward the diffuser at a predetermined angle; and the reflecting layer is formed on the lateral surface.

12. The backlight module as claimed in claim 11, wherein the first supporting element has two lateral surfaces conjugated at an angle of 20° to 60°.

13. The backlight module as claimed in claim 11, wherein the supporting portion further has a second supporting element having the same structure as the first supporting element but extending in a second direction parallel to the diffuser and different from the first direction.

14. The backlight module as claimed in claim 9 or 10, wherein the first locating portion comprises a first locating hole receiving the connecting portion.

15. The backlight module as claimed in claim 14, wherein the second locating portion comprises a second locating hole aligned with the first locating hole receiving the connecting portion.

16. The backlight module as claimed in claim 10, wherein the first locating portion comprises a first locating groove receiving the connecting portion.

17. The backlight module as claimed in claim 16, wherein the second locating portion comprises a second locating groove aligned with the first locating groove receiving the connecting portion.

* * * * *